Jan. 17, 1933.  R. WHITING  1,894,840
COTTON HOE AND REAPER
Filed Nov. 6, 1931   5 Sheets-Sheet 1
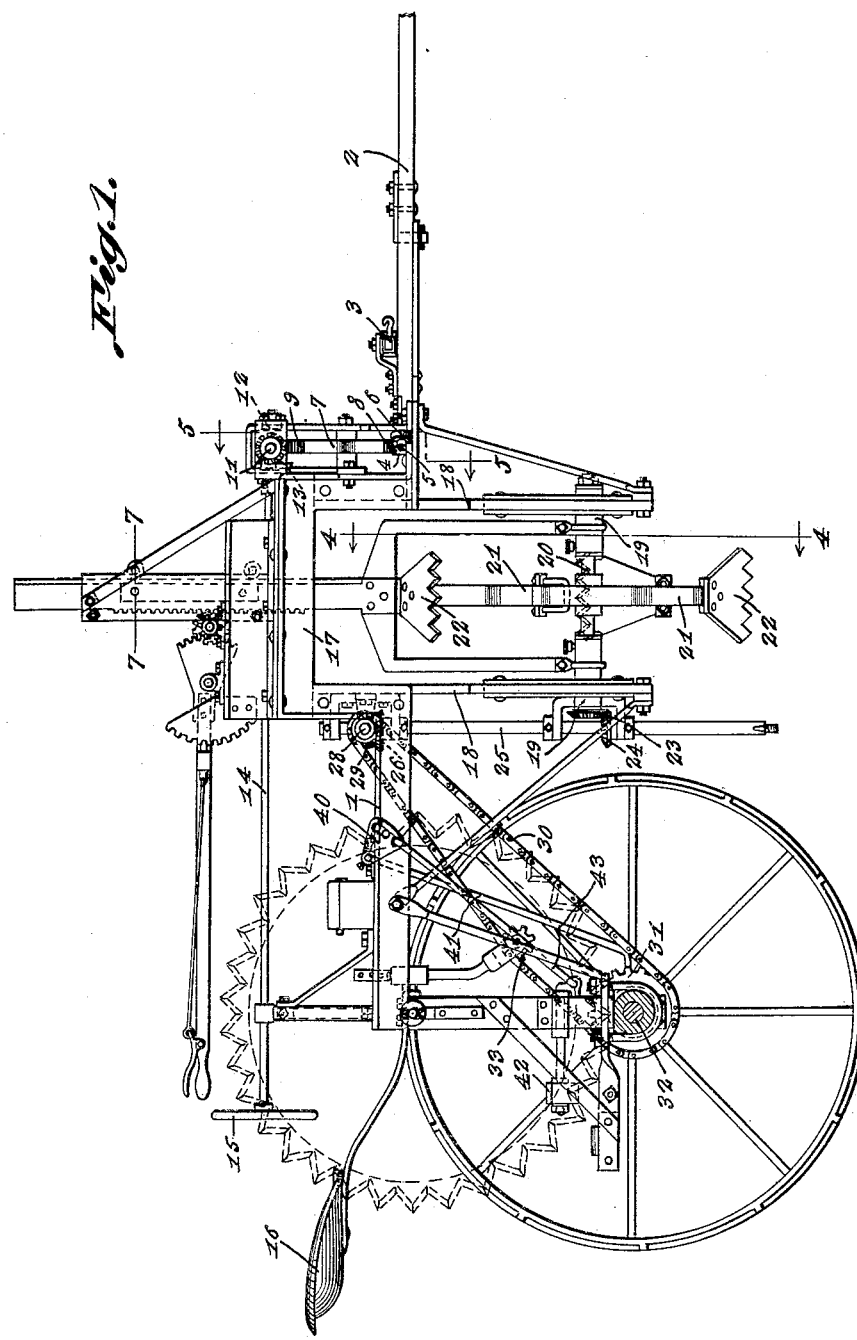
Rufus Whiting, INVENTOR
BY Victor J. Evans and Co.
ATTORNEY

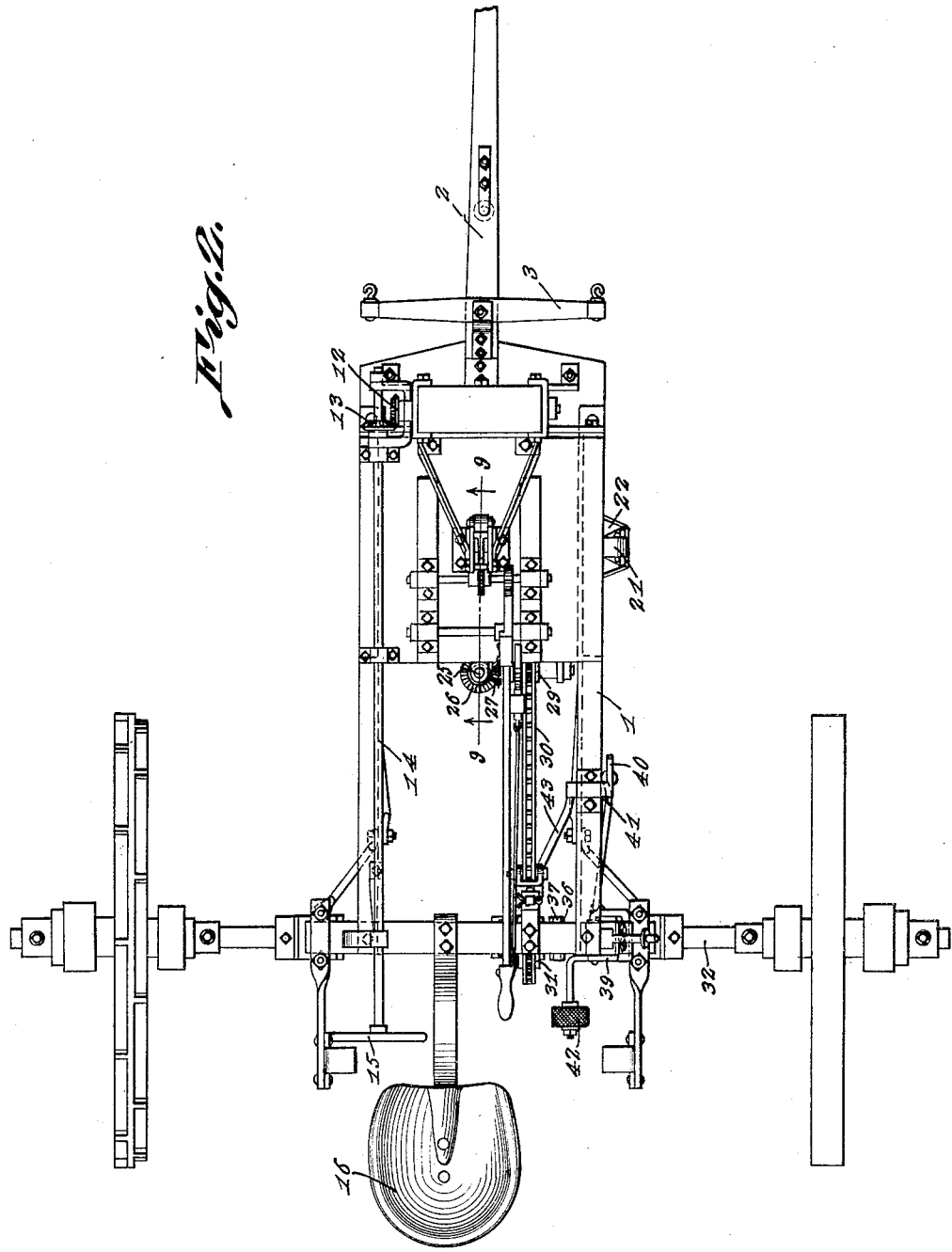

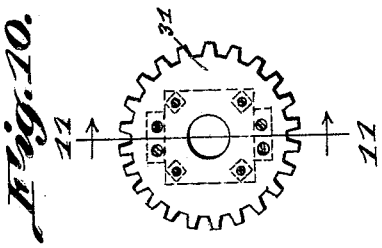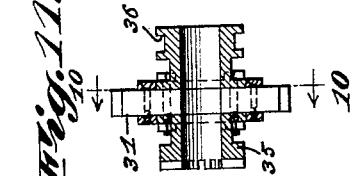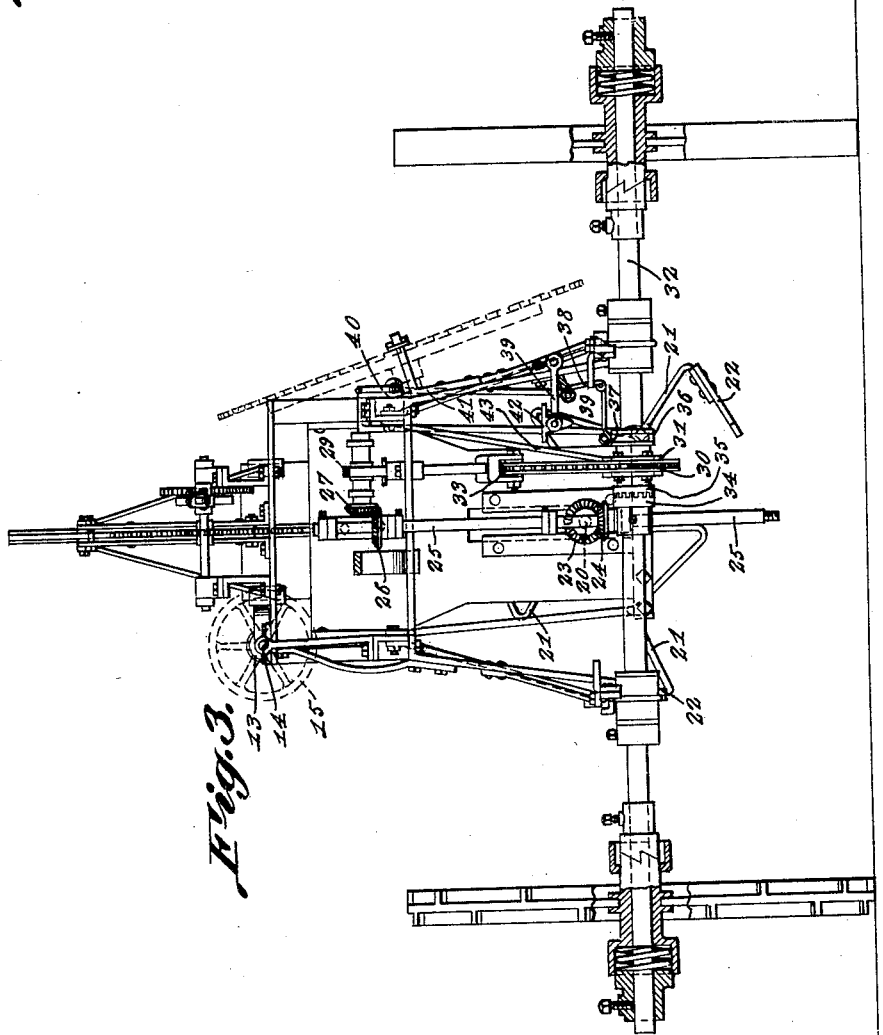

Jan. 17, 1933.    R. WHITING    1,894,840
COTTON HOE AND REAPER
Filed Nov. 6, 1931    5 Sheets-Sheet 4
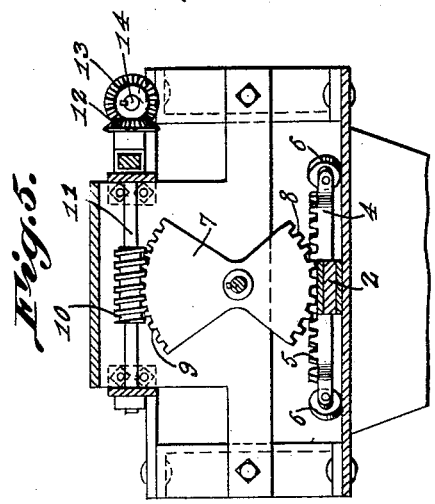
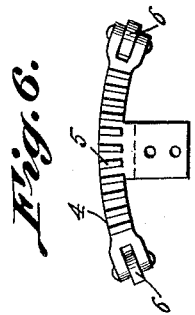
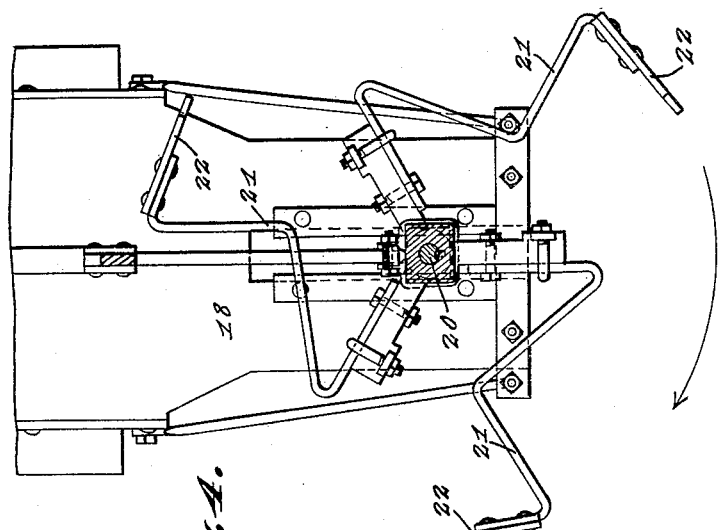
Rufus Whiting, INVENTOR
BY Victor J. Evans and Co.
ATTORNEY

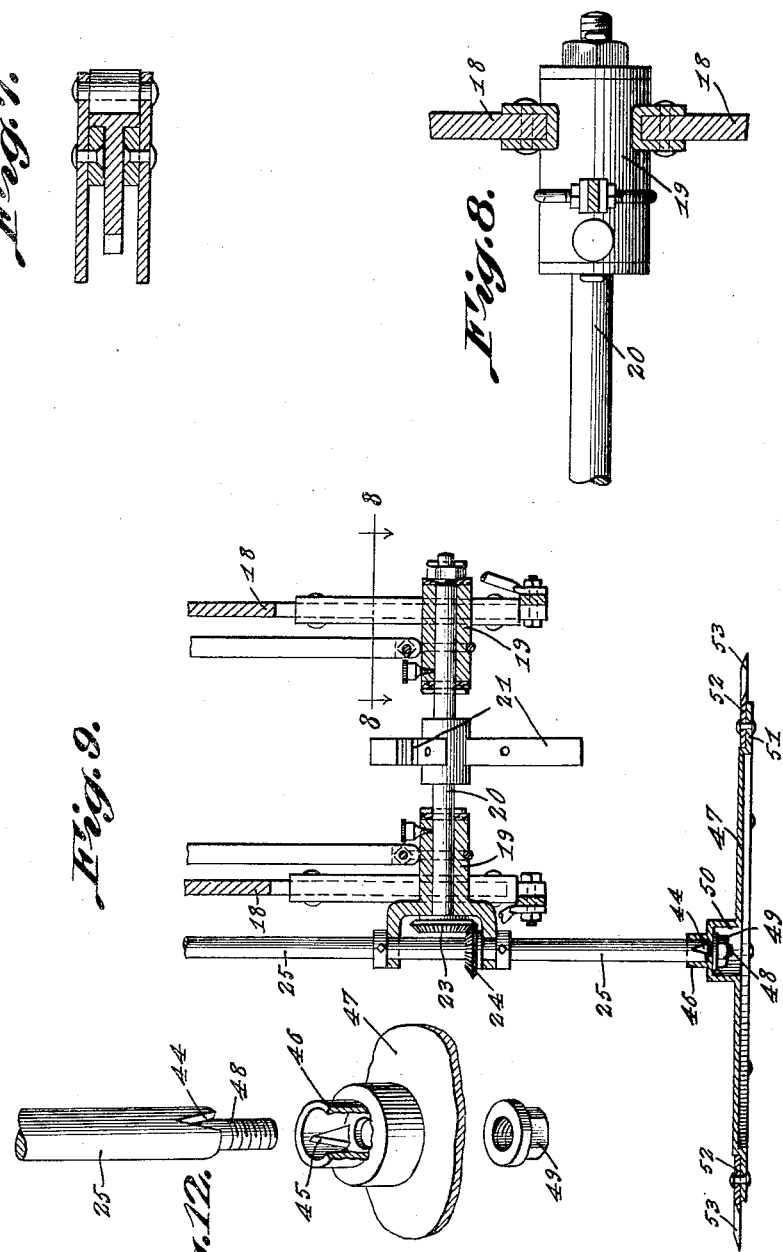

Patented Jan. 17, 1933

1,894,840

UNITED STATES PATENT OFFICE

RUFUS WHITING, OF PALESTINE, TEXAS

COTTON HOE AND REAPER

Application filed November 6, 1931. Serial No. 573,456.

This invention relates to a cotton hoe and reaping machine, and it consists in the novel features hereinafter described and claimed.

An object of the invention is to provide a machine of the character stated, adapted to be drawn over a field having cotton plants standing thereon, there being means provided upon the machine for steering the same, means for cutting the stalks of cotton and means for hoeing the soil cutting the roots of the plants.

In the accompanying drawings:—

Figure 1 is a side elevational view of the cotton hoe and reaper with parts removed and parts shown in sections.

Figure 2 is a top plan view thereof.

Figure 3 is a rear elevational view with parts broken away and parts shown in section.

Figure 4 is a detailed sectional view cut on the line 4—4 of Figure 1.

Figure 5 is a similar view cut on the line 5—5 of Figure 1.

Figure 6 is a plan view of a part used in the steering apparatus of the machine.

Figure 7 is a detailed sectional view through parts of the machine and cut on the line 7—7 of Figure 1.

Figure 8 is a similar view cut on the line 8—8 of Figure 9.

Figure 9 is a fragmentary sectional view cut on the line 9—9 of Figure 2.

Figure 10 is a side view of a sprocket wheel used in the machine.

Figure 11 is a sectional view cut on the line 11—11 of Figure 10.

Figure 12 is a perspective view of parts of the machine separated.

As illustrated in the accompanying drawings, the cotton hoe and reaper comprises a frame 1 having a tongue 2 pivotally mounted upon the forward end thereof. A tree 3 is mounted upon the tongue and to which draft-animals (not shown) may be hitched in the usual manner. The tongue 2 is provided at its rear end with a segment 4 having teeth 5 thereon, and the segment is provided at its ends with rollers 6 adapted to move upon the frame 1 whereby the tongue 2 may be readily swung sideways. A segment 7 is pivoted at the forward end of the frame and provided with teeth 8 which engage the teeth 5. The segment 7 is further provided with teeth 9 which are engaged by a worm 10 mounted upon a shaft 11 journaled upon the top of the frame. The shaft 11 is provided at one end with a beveled gear wheel 12 which meshes with the beveled gear wheel 13 mounted upon the shaft 14, the said shaft having at its rear end a steering wheel 15 located in the vicinity of an operator's seat 16 mounted upon the frame 1. The occupant of the seat 16 may manipulate the wheel 15 and shaft 14 whereby the shaft 11 is turned and the segment 7 is rocked thus swinging the tongue 2. By reason of this arrangement, the machine may be directed or steered over the surface of the ground. The frame 1 is provided at its intermediate portion with an arch 17 having guides 18 depending from the ends thereof. Plates 19 are vertically slidable in the guides 18 and a shaft 20 is journaled in the plates 19. Arms 21 are attached to the shaft 20 and carry at their ends hoe blades 22. The shaft 20 is provided at one end with a beveled gear wheel 23 which meshes with a beveled gear wheel 24 splined upon a vertical shaft 25. The shaft 25 is journaled upon the frame 1. The shaft 25 is provided at its upper end with a beveled gear wheel 26 which meshes with a beveled gear wheel 27 fixed to a shaft 28 also journaled upon the frame. A sprocket wheel 29 is fixed to the shaft 28 and a sprocket chain 30 is trained around the sprocket wheel 29 and also around a sprocket wheel 31 mounted upon an axle 32 which is journaled at the rear portion of the frame 1. A wheel 33 engages under the upper run of the chain 30 and is adapted to keep the said chain tight. As the axle 32 rotates, rotary movement is transmitted through the chain 30 to the shaft 28 and from the said shaft through the intermeshing gear wheels 26 and 27 to the shaft 25. Through the gear wheels 24 and 23, movement is transmitted through the shaft 25 to the shaft 20 and thus the hoe blades 22 are caused to move transversely across a row of standing plants and chop the same.

A clutch member 34 is fixed to the axle 32 and adapted to be engaged by a clutch member 35 provided at the hub of the wheel 31. The hub of the wheel 35 is provided with a groove 36 in which is located a yoke 37 attached to an arm 38 pivoted upon the frame 1. A rod 39 is connected with said arm and also with a segment 40 pivoted upon the frame 1. A rod 41 connects said segment with a foot treadle 42 pivoted upon the frame. When the operator presses his foot upon the treadle and swings the same, the gear 31 is moved longitudinally whereby the segment 40 is swung and the arm 38 is moved so that the yoke 37 withdraws the clutch member 35 from the clutch member 34. The clutch member 35 is slidable upon the axle 32. Another arm 43 is connected with the segment 40 and is adapted to engage the teeth of the sprocket wheel 31 whereby the said sprocket wheel is brought to a state of rest when the clutch members are separated.

The shaft 25 is provided at its lower end with a notch 44 adapted to receive a lug 45 in a sleeve 46 mounted at the center of a disk 47. The shaft 25 is further provided with a stud 48 which passes through the center of the disk and upon which a nut 49 is screwed. The nut 49 is located in a housing 50 provided at the center of the disk. The disk 47 is provided at its periphery with an offset flange 51 upon which is mounted an annular blade 59 having V-shaped cutting edges 53. When the disk 47 is applied to the lower end of the shaft 25 and the said shaft rotates, the cutting edges 53 of the annulus 52 will cut the stalks of the standing plants as the machine passes over the field. When the disk 47 is not in use it may be removed from the shaft 25 and placed upon a bracket 54 at the side of the frame 1.

Having described the invention, what is claimed is:

1. A machine of the character described comprising a wheel mounted frame having an arched portion, guides carried by the frame at the forward and rear ends of the arched portion thereof, a shaft movable in the guides, means for raising and lowering said shaft, a second shaft journaled upon the frame behind the arched portion thereof and disposed at a right angle to the first mentioned shaft, means for operating the second mentioned shaft from the mounting wheel and a tongue connected with the frame in advance of the arched portion thereof.

2. A machine of the character described comprising a wheel mounted frame having an arched portion, guides carried by the frame at the forward and rear ends of the arched portion thereof, a shaft movable in the guides, means for raising and lowering said shaft, a second shaft journaled upon the frame behind the arched portion thereof and disposed at a right angle to the first mentioned shaft, means for operating the second mentioned shaft from the mounting wheel, a tongue connected with the frame in advance of the arched portion thereof, a steering shaft journaled upon the arched portion and disposed transversely thereof and means operatively connecting the steering shaft with the tongue to swing the same.

3. A machine of the character described comprising a wheel mounted frame having an arched portion, guides carried by the frame at the ends of the arched portion thereof, a shaft movable in the guides, means for raising and lowering said shaft, a second shaft journaled in the frame and disposed at a right angle to the first mentioned shaft, means for operating the second mentioned shaft from the mounting wheel, a tongue connected with the frame in advance of the arched portion thereof, arms mounted upon the first mentioned shaft and having substantially parallel end portions and angularly disposed intermediate portions and blades carried at the outer end portions of the arms.

In testimony whereof I affix my signature.

RUFUS WHITING.